(12) United States Patent
George et al.

(10) Patent No.: US 12,524,739 B2
(45) Date of Patent: *Jan. 13, 2026

(54) CREATING AND USING TRIPLET REPRESENTATIONS TO ASSESS SIMILARITY BETWEEN JOB DESCRIPTION DOCUMENTS

(71) Applicant: International Business Machines Corporation, Armonk, NY (US)

(72) Inventors: David G. George, Cary, NC (US); Sudhanshu S. Singh, New Delhi (IN); Joydeep Mondal, New Delhi (IN); Sarthak Ahuja, New Delhi (IN); John A. Medicke, Raleigh, NC (US); Amanda Klabzuba, Frisco, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/729,939

(22) Filed: Apr. 26, 2022

(65) Prior Publication Data

US 2022/0261766 A1 Aug. 18, 2022

Related U.S. Application Data

(63) Continuation of application No. 15/854,837, filed on Dec. 27, 2017, now Pat. No. 11,410,130.

(51) Int. Cl.
*G06Q 10/1053* (2023.01)
*G06F 7/02* (2006.01)
(Continued)

(52) U.S. Cl.
CPC ......... *G06Q 10/1053* (2013.01); *G06F 7/026* (2013.01); *G06F 40/205* (2020.01); *G06F 40/30* (2020.01)

(58) Field of Classification Search
CPC .... G06Q 10/1053; G06Q 50/01; G06Q 10/10; G06Q 10/063112; G06Q 10/105;
(Continued)

(56) References Cited

U.S. PATENT DOCUMENTS 6,917,952 B1 7/2005 Dailey et al.
7,013,264 B2 3/2006 Dolan et al.
(Continued)

FOREIGN PATENT DOCUMENTS

| CN | 101079026 A | * | 11/2007 | |
| CN | 105786781 A | * | 7/2016 | ........... G06F 40/284 |
| CN | 106250502 A | | 12/2016 | |

OTHER PUBLICATIONS

Guo, "personalized resume job matching system". (Year: 2016).*
(Continued)

*Primary Examiner* — Sangeeta Bahl
(74) *Attorney, Agent, or Firm* — Shackelford, McKinley & Norton, LLP; Robert A. Voigt, Jr.

(57) ABSTRACT

A method, system and computer program product for assessing similarity between two job description documents. Job description documents consist of sentences framed in a particular manner, where the sentences are represented as a set of actions, an object corresponding to each action and a set of attributes corresponding to the object. The two job description documents are parsed to generate a first and a second set of an action-object-attribute triplet representation, where the first set of the action-object-attribute triplet representation is associated with the first job description document and the second set of the action-object-attribute triplet representation is associated with the second job description document. A similarity score between the first and second sets of action-object-attribute triplet representations is then calculated by hierarchically matching the first and second sets of action-object-attribute triplet representa-
(Continued)

tions across the job description documents. In this manner, similar job positions/job descriptions may be more accurately identified.

12 Claims, 6 Drawing Sheets

(51) Int. Cl.
*G06F 40/205* (2020.01)
*G06F 40/30* (2020.01)

(58) Field of Classification Search
CPC .... G06Q 30/08; G06Q 30/0254; G06Q 90/00; G06Q 10/06311; G06Q 10/067; G06Q 10/00; G06Q 10/06315; G06Q 10/107; G06Q 30/00; G06Q 30/02; G06Q 30/0201; G06Q 30/0207; G06Q 30/0214; G06Q 30/0241; G06Q 30/0276; G06Q 30/0631; G06Q 50/10; G06Q 50/20; G06F 7/026; G06F 40/205; G06F 40/30; G06N 20/00; G06N 5/04; G06N 5/022; G06N 7/005; G06N 20/10; G06N 3/04; G06N 5/003; G06N 3/0445; G06N 3/0454; G06N 3/0481; G06N 3/08; G06N 3/084; G06N 3/088; G06N 5/025; G06N 5/046

See application file for complete search history.

(56) References Cited

U.S. PATENT DOCUMENTS

| | | | |
|---|---|---|---|
| 7,533,094 B2* | 5/2009 | Zhang | G06F 16/3347 707/999.005 |
| 7,610,281 B2 | 10/2009 | Gandhi et al. | |
| 7,644,047 B2 | 1/2010 | Assadian et al. | |
| 8,099,415 B2* | 1/2012 | Luo | G06F 16/258 707/758 |
| 8,594,239 B2 | 11/2013 | Manasse et al. | |
| 8,612,457 B2* | 12/2013 | Brdiczka | G06F 16/334 706/58 |
| 8,650,199 B1 | 2/2014 | Tong | |
| 8,688,690 B2 | 4/2014 | Brdiczka et al. | |
| 9,201,927 B1 | 12/2015 | Zhang | |
| 9,235,624 B2 | 1/2016 | Zhou | |
| 9,355,151 B1* | 5/2016 | Cranfill | G06F 16/24578 |
| 9,514,221 B2 | 12/2016 | Tropin et al. | |
| 9,710,518 B2 | 7/2017 | Cheng et al. | |
| 9,892,111 B2 | 2/2018 | Danielyan et al. | |
| 11,410,130 B2 | 8/2022 | George et al. | |
| 2005/0060643 A1 | 3/2005 | Glass et al. | |
| 2007/0185871 A1* | 8/2007 | Canright | G06F 16/3347 707/E17.08 |
| 2007/0288308 A1 | 12/2007 | Chen et al. | |
| 2008/0065630 A1 | 3/2008 | Luo et al. | |
| 2013/0031088 A1 | 1/2013 | Srikrishna et al. | |
| 2016/0232160 A1* | 8/2016 | Buhrmann | G06Q 10/1053 |
| 2017/0300563 A1* | 10/2017 | Kao | G06N 7/01 |

OTHER PUBLICATIONS

Cunningham, "A Taxonomy of similarity mechanism for case based reasoning" (Year: 2009).*
List of IBM Patents or Patent Applications Treated as Related, May 11, 2022, pp. 1-2.
Ahuja et al., "Similarity Computation Exploiting the Semantic and Syntactic Inherent Structure Among Job Titles," CSOC 2017, LNCS 10601, 2017, pp. 3-18.
Samuel W.K. Chan, "Integrating Linguistic Primitives in Learning Context-Dependent Representation," IEEE Transactions on Knowledge and Data Engineering, vol. 13, No. 2, Mar./Apr. 2001, pp. 157-175.
Padraig Cunningham, "A Taxonomy of Similarity Mechanisms for Case-Based Reasoning," IEEE Transactions on Knowledge and Data Engineering, vol. 21, No. 11, Nov. 2009, pp. 1532-1543.

* cited by examiner

|  | DETERMINE | EVALUATE |
|---|---|---|
| REGULATE | 0.30 | 0.25 |
| EVALUATE | 0.31 | 1.0 |

FIG. 6

|  | FEASIBILITY |
|---|---|
| VIABILITY | 0.60 |

FIG. 7

|  | SURVEY | REQUIREMENTS | RESOLUTION DEVELOPMENT |
|---|---|---|---|
| ANALYSIS | 0.36 | 0.30 | 0.15 |
| PROBLEM DEFINITION | 0.16 | 0.13 | 0.26 |
| REQUIREMENTS | 0.24 | 1.0 | 0.15 |
| SOLUTION DEVELOPMENT | 0.17 | 0.15 | 0.65 |
| SOLUTIONS | 0.34 | 0.31 | 0.15 |

FIG. 8

|  | OPERATIONAL |
|---|---|
| OPERATIONAL | 1.0 |

FIG. 9

CREATING AND USING TRIPLET REPRESENTATIONS TO ASSESS SIMILARITY BETWEEN JOB DESCRIPTION DOCUMENTS

TECHNICAL FIELD

The present invention relates generally to job descriptions, and more particularly to creating and using action-object-attribute triplet representations to assess the similarity between two job description documents.

BACKGROUND

Job descriptions are written documents used to describe a job or a project. In particular, a job description may be designed to give applicants, employees and managers a good understanding of what is involved in a job and the broad duties and responsibilities of the post. Job descriptions have multiple uses. Job descriptions are used in recruitment to give applicants an idea of what the job involves. A well written job description can help applicants decide whether they are interested in the job and if they have relevant skills and experience to do it.

In addition, job descriptions are used by staff and their managers to ensure that there is a clear understanding of the job requirements and to ensure that it is graded appropriately in accordance with the responsibilities and duties it involves and in comparison to other comparator roles.

Currently, the recruiting process is evaluated at the company or industry wide level. For example, the recruiting process may be evaluated based on the time to fill a position or the time to interview a potential candidate, etc. However, such benchmarks may be misleading since the recruitment process may vary significantly across different job positions/job descriptions. It would be more meaningful to evaluate the recruitment process regarding similar job positions/job descriptions. However, there is no such tool for effectively and accurately identifying similar job positions/job descriptions.

Furthermore, current tools used to match candidates to available jobs rely heavily on mapping jobs described in the applicant tracking system (software application that enables the electronic handling of recruitment needs) and the candidates' resume (or curriculum vitae) to a standardized job taxonomy (scheme of classification). However, such classifications are deficient in that similar job positions/job descriptions are not able to be accurately identified using conventional means.

SUMMARY

In one embodiment of the present invention, a computer-implemented method for assessing similarity between two job description documents comprises receiving a first and a second job description document, where each of the first and second job description documents comprises sentences represented as a set of actions, an object corresponding to each action and a set of attributes corresponding to the object. The method further comprises parsing the first and second job description documents to generate a first and a second set of an action-object-attribute triplet representation, where the first set of action-object-attribute triplet representation is associated with the first job description document and the second set of action-object-attribute triplet representation is associated with the second job description document. The method additionally comprises calculating a similarity score between the first and second sets of action-object-attribute triplet representations. Furthermore, the method comprises determining a degree of similarity between the first and the job description documents based on the similarity score, where the higher a value of the similarity score, the greater the degree of similarity between the first and second job description documents.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for assessing similarity between two job description documents. In one embodiment of the present invention, a mechanism, referred to herein as a "job description analyzer," receives two job description documents. A "job description document," as used herein, refers to a written document in electronic form that is used to describe a job or a project. Job description documents may consist of sentences framed in a particular manner, where the sentences are represented as a set of actions, an object corresponding to each action and a set of attributes corresponding to the object. An "action," as used herein, refers to the fact or process of doing something, typically to achieve an aim. An "object," as used herein, refers to the thing to which the specified action is directed. An "attribute," as used herein, refers to the characteristic or feature of the object. The job description analyzer parses the received job description documents to generate a first and a second set of an action-object-attribute triplet representation, where the first set of the action-object-attribute triplet representation is associated with the first job description document and the second set of the action-object-attribute triplet representation is associated with the second job description document. The job description analyzer parses the received job description documents so as to represent them as a collection of action, object and attribute triplets. The job description analyzer then calculates a similarity score between the first and second sets of action-object-attribute triplet representations by hierarchically matching the first and second sets of action-object-attribute triplet representations across the job description documents. In one embodiment, the similarity score between the first and second sets of action-object-attribute triplet representations is performed as solving an imbalanced assignment problem to find the best match of all triplets in the two documents. A similarity score is used to assess the degree of similarity between the sets of action-object-attribute triplet representations of the two job description documents. In this manner, similar job positions/job descriptions may be more accurately identified.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses the present invention in connection with assessing the similarity between two job description documents, the principles of the present invention may be applied to other types of textual documents, where an assessment of the similarity between such documents is important. A person of ordinary skill in the art would be capable of applying the principles of the present invention to such implementations. Further, embodiments applying the principles of the present invention to such implementations would fall within the scope of the present invention.

Figure 1:
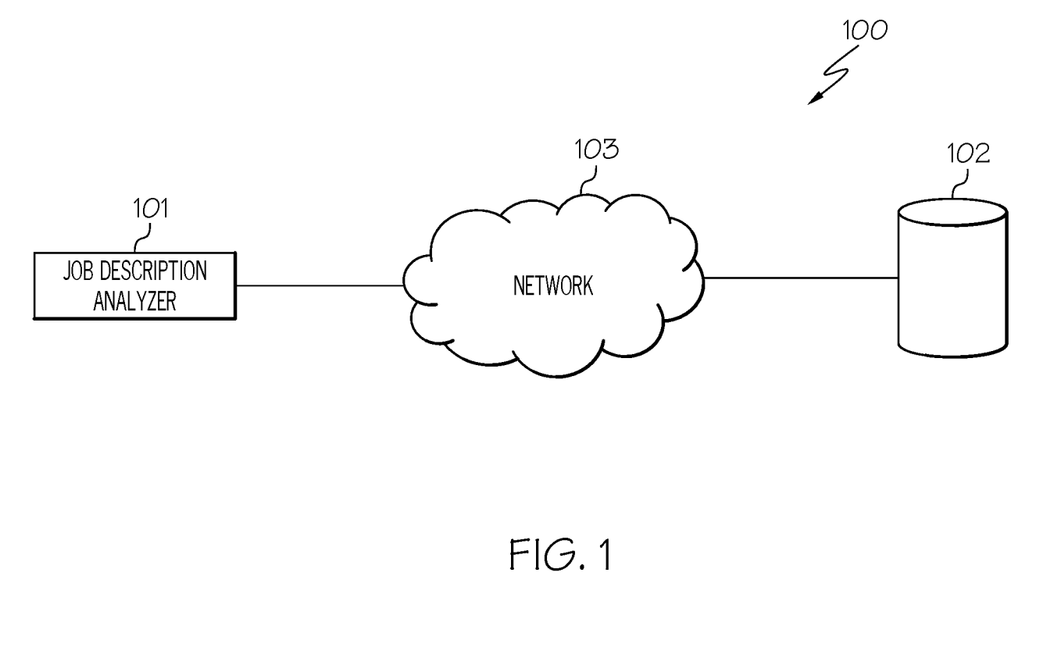
FIG. 1 illustrates a system configured in accordance with an embodiment of the present invention.

Referring now to the Figures in detail, FIG. 1 illustrates a system 100 configured in accordance with an embodiment of the present invention. System 100 includes a job description analyzer 101 connected to a database 102 populated with job description documents via a network 103.

Job description analyzer 101 is configured to analyze job description documents and to calculate the similarity between the job description documents using action-object-attribute triplet representations as discussed further below. A description of an embodiment of a hardware configuration of job description analyzer 101 is provided below in connection with FIG. 2.

Database 102 is populated with job description documents, where a "job description document," as used herein, refers to a written document in electronic form that is used to describe a job or a project. Job description documents may consist of sentences framed in a particular manner. For example, they can be represented as a set of actions, an object corresponding to each action and a set of attributes corresponding to the object. For example, in a portion of a sentence that states "determines operational feasibility by evaluating problem definitions, requirements, solution developments and proposed solutions," the following illustrates the various actions, objects and attributes identified in the sentence by job description analyzer 101:

action: determines; object: feasibility; attributes: [operational]
action: evaluating; object: problem definitions; attributes: [ ]
action: evaluating; object: requirements; attributes: [ ]
action: evaluating; object: solution developments; attributes: [ ]
action: evaluating; object: solutions; attributes: [proposed]

A further discussion regarding job description analyzer 101 generating such action-object-attribute triplet representations is discussed further below.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 is not to be limited in scope to any one particular network architecture. System 100 may include any number of job description analyzers 101, databases 102 and networks 103.

Figure 2:
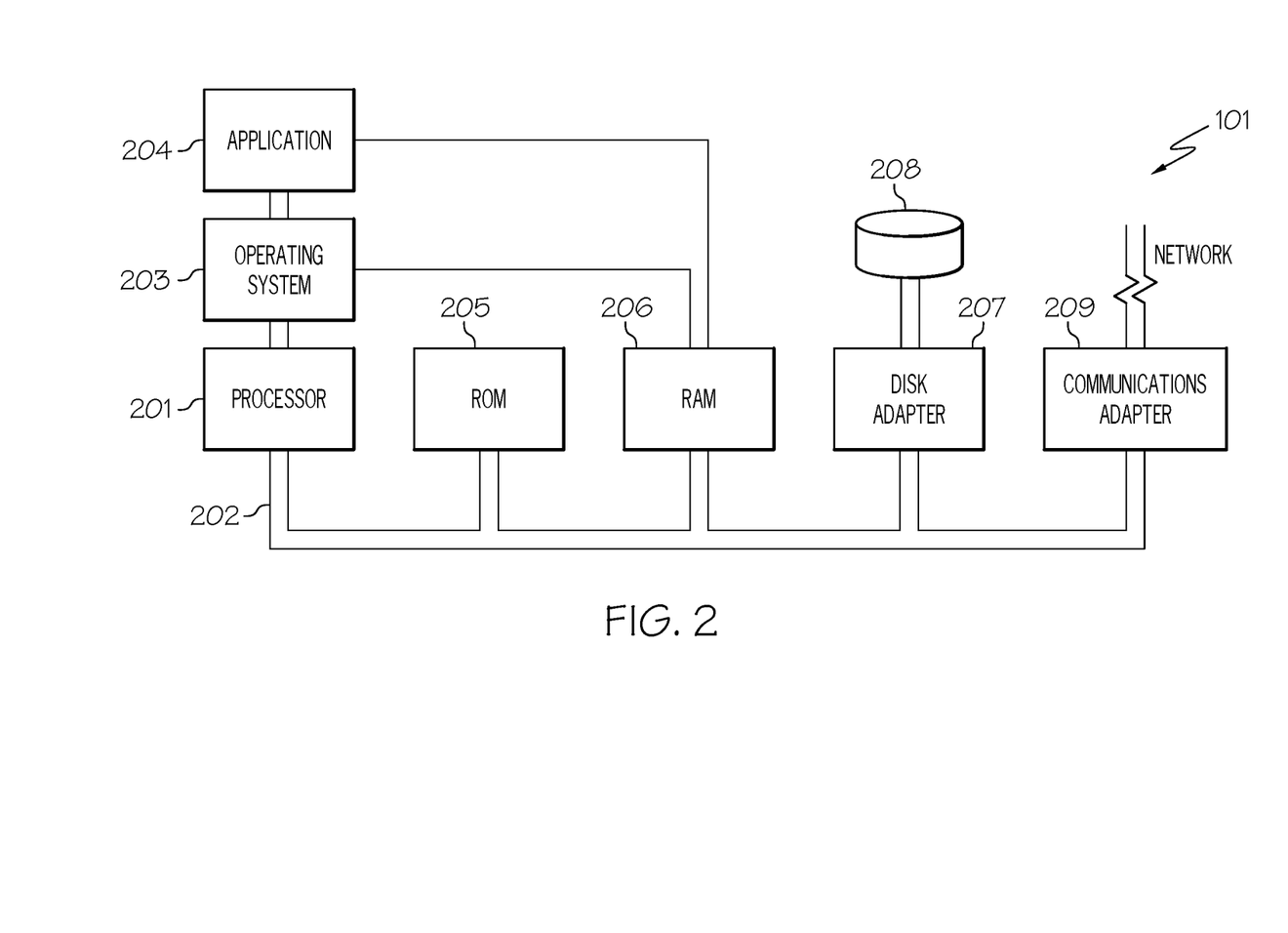
FIG. 2 illustrates a hardware configuration of the job description analyzer which is representative of a hardware environment for practicing the present invention.

Referring now to FIG. 2, FIG. 2 illustrates an embodiment of the present invention of a hardware configuration of job description analyzer 101 (FIG. 1) which is representative of a hardware environment for practicing the present invention. Referring to FIG. 2, job description analyzer 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for analyzing job description documents and calculating the similarity between the job description documents using action-object-attribute triplet representations as discussed further below in connection with FIGS. 3-9.

Referring again to FIG. 2, read-only memory ("ROM") 205 is coupled to system bus 202 and includes a basic input/output system ("BIOS") that controls certain basic functions of job description analyzer 101. Random access memory ("RAM") 206 and disk adapter 207 are also coupled to system bus 202. It should be noted that software components including operating system 203 and application 204 may be loaded into RAM 206, which may be job description analyzer's 101 main memory for execution. Disk adapter 207 may be an integrated drive electronics ("IDE") adapter that communicates with a disk unit 208, e.g., disk drive. It is noted that the program for analyzing job description documents and calculating the similarity between the job description documents using action-object-attribute triplet representations, as discussed further below in connection with FIGS. 3-9, may reside in disk unit 208 or in application 204.

Job description analyzer 101 further includes a communications adapter 209 coupled to bus 202. Communications adapter 209 interconnects bus 202 with an outside network (e.g., network 103 of FIG. 1) thereby allowing job description analyzer 101 to analyze job description documents stored in database 102.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, the recruiting process is evaluated at the company or industry wide level. For example, the recruiting process may be evaluated based on the time to fill a position or the time to interview a potential candidate, etc. However, such benchmarks may be misleading since the recruitment process may vary significantly across different job positions/job descriptions. It would be more meaningful to evaluate the recruitment process regarding similar job positions/job descriptions. However, there is no such tool for effectively and accurately identifying similar job positions/job descriptions. Furthermore, current tools used to match candidates to available jobs rely heavily on mapping jobs described in the applicant tracking system (software application that enables the electronic handling of recruitment needs) and the candidates' resume (or curriculum vitae) to a standardized job taxonomy (scheme of classification). However, such classifications are deficient in that similar job positions/job descriptions are not able to be accurately identified using conventional means.

Figure 3:
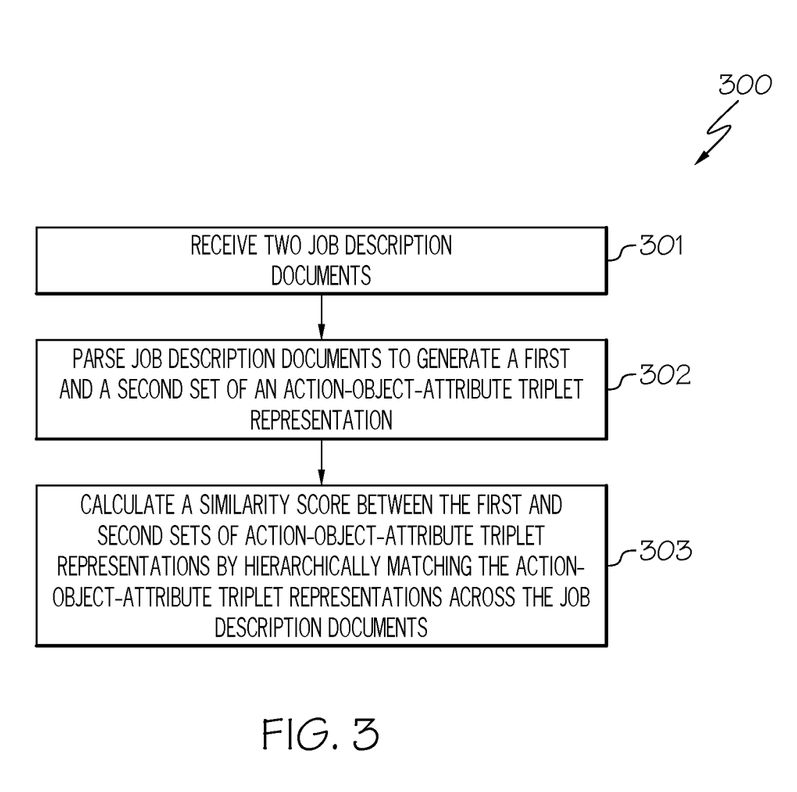
FIG. 3 is a flowchart of a method for assessing the similarity between two job description documents in accordance with an embodiment of the present invention.
Figure 4:
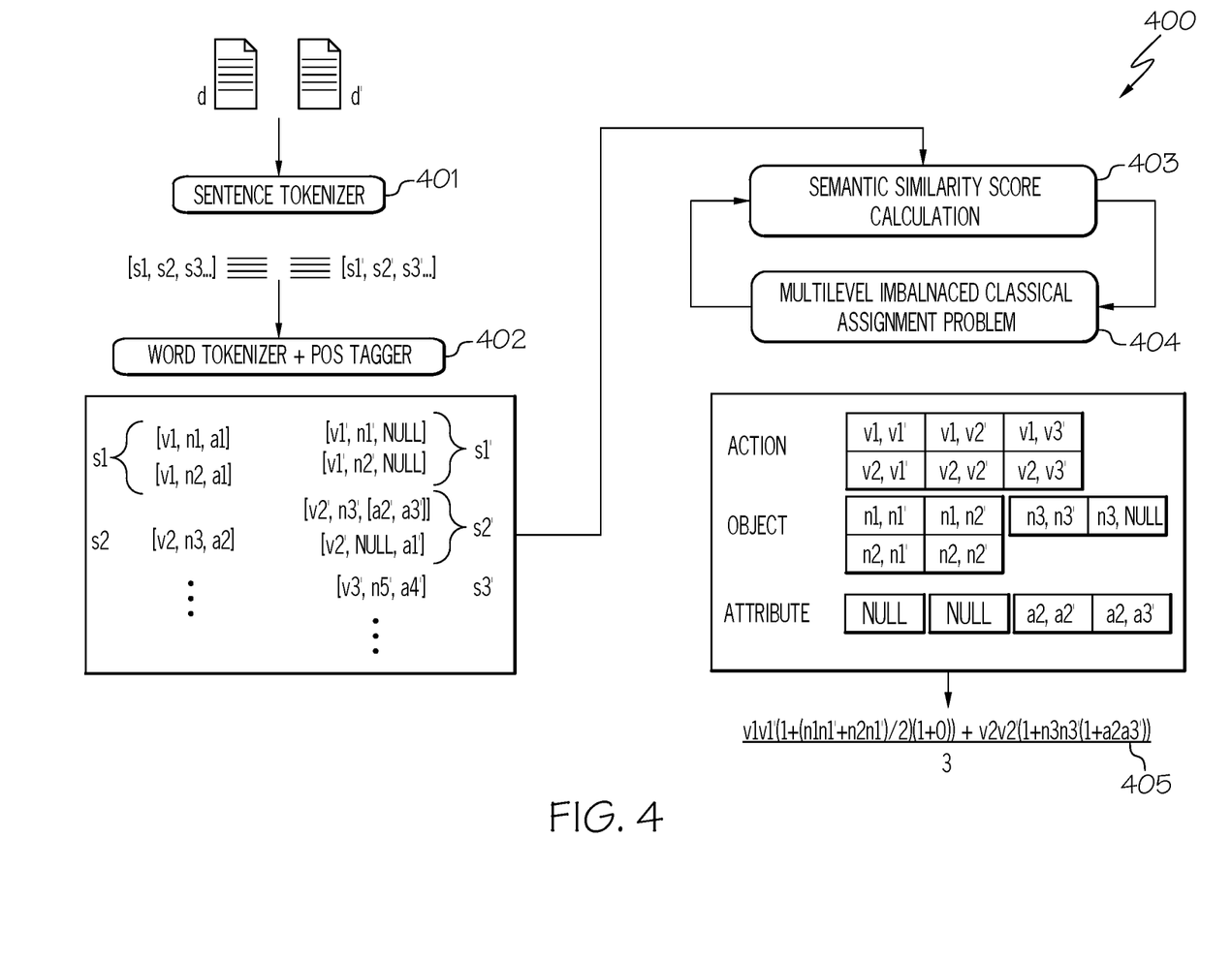
FIG. 4 is a diagram illustrating the process for assessing the similarity between two job description documents by calculating a similarity score between the action-object-attribute triplet representations of the job description documents in accordance with an embodiment of the present invention.
Figure 5:
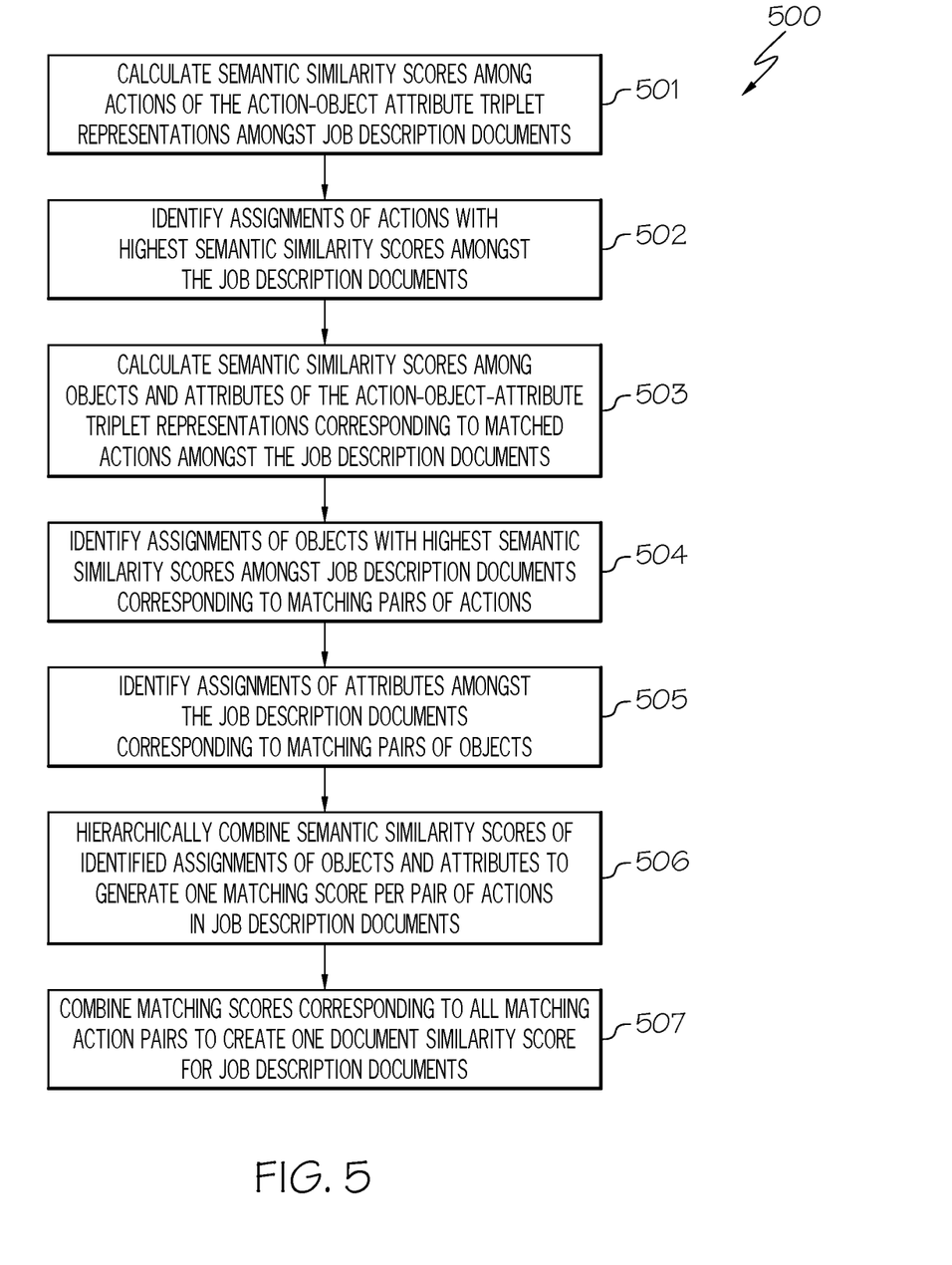
FIG. 5 is a flowchart of a method for calculating an overall similarity score for a pair of documents by solving a multilevel imbalanced classical assignment problem in accordance with an embodiment of the present invention.
Figure 6:
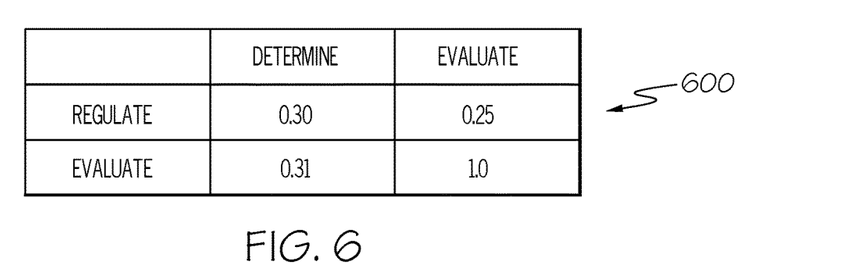
FIG. 6 illustrates an action similarity matrix in accordance with an embodiment of the present invention.
Figure 7:
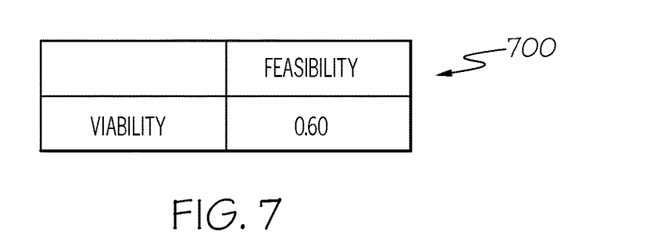
FIG. 7 illustrates the object similarity matrix for action assignments (1) in accordance with an embodiment of the present invention.
Figure 8:
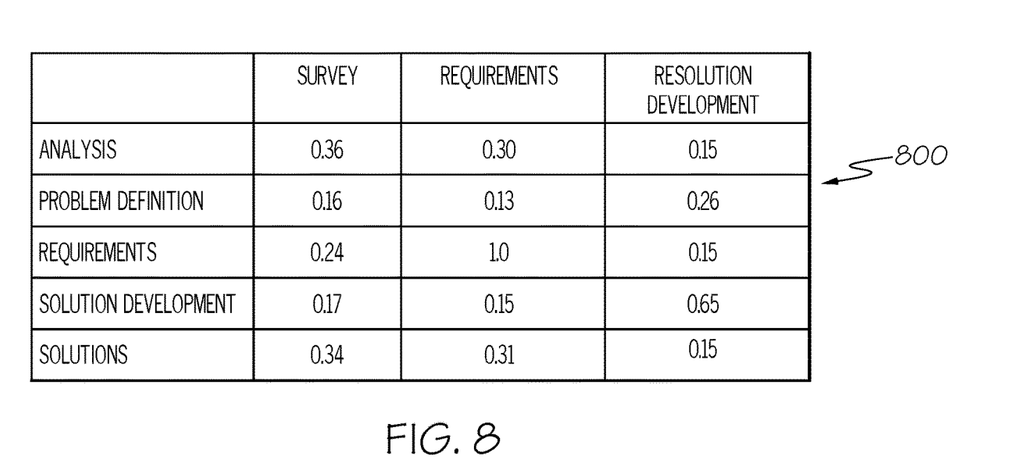
FIG. 8 illustrates the object similarity matrix for action assignments (2) in accordance with an embodiment of the present invention.
Figure 9:
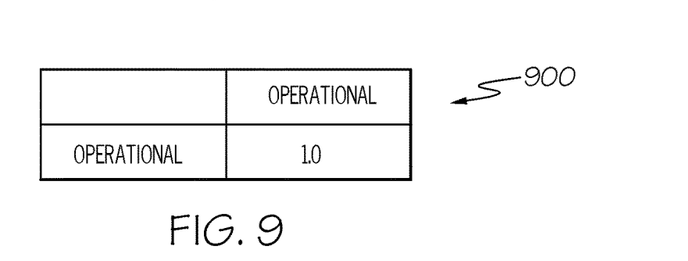
FIG. 9 illustrates the attribute similarity matrix for object assignment (1) in accordance with an embodiment of the present invention.

The principles of the present invention provide a means for accurately identifying similar job descriptions by accurately assessing the similarity between two job description documents using action-object-attribute triplet representations across the job description documents as discussed below in connection with FIGS. 3-9. FIG. 3 is a flowchart of a method for assessing the similarity between two job description documents. FIG. 4 is a diagram illustrating the process for assessing the similarity between two job description documents by calculating a similarity score between the action-object-attribute triplet representations of the job description documents. FIG. 5 is a flowchart of a method for calculating an overall similarity score for a pair of documents by solving a multilevel imbalanced classical assignment problem. FIG. 6 illustrates an action similarity matrix. FIG. 7 illustrates the object similarity matrix for action assignments (1). FIG. 8 illustrates the object similarity matrix for action assignments (2). FIG. 9 illustrates the attribute similarity matrix for object assignment (1).

As stated above, FIG. 3 is a flowchart of a method 300 for assessing the similarity between two job description documents in accordance with an embodiment of the present invention.

Referring to FIG. 3, in conjunction with FIGS. 1-2, in step 301, job description analyzer 101 receives two job description documents. In one embodiment, users of job description analyzer 101 may upload two job description documents to be compared. In one embodiment, such job description documents are obtained from database 102. A "job description document," as used herein, refers to a written document in electronic form that is used to describe a job or a project. Job description documents may consist of sentences framed in a particular manner, where the sentences are represented as a set of actions, an object corresponding to each action and a set of attributes corresponding to the object. An "action," as used herein, refers to the fact or process of doing something, typically to achieve an aim. An "object," as used herein, refers to the thing to which the specified action is directed. An "attribute," as used herein, refers to the characteristic or feature of the object.

In step 302, job description analyzer 101 parses the received job description documents to generate a first and a second set of an action-object-attribute triplet representation, where the first set of the action-object-attribute triplet representation is associated with the first job description document and the second set of the action-object-attribute triplet representation is associated with the second job description document. That is, job description analyzer 101 parses the received job description documents so as to represent them as a collection of action, object and attribute triplets.

In one embodiment, a sentence tokenizer 401 (application of job description analyzer 101, such as application 204) is used to identify the list of sentences in the job description documents (documents "d" and "d'") as shown in FIG. 4. FIG. 4 is a diagram 400 illustrating the process for assessing the similarity between two job description documents by calculating a similarity score between the action-object-attribute triplet representations of the job description documents in accordance with an embodiment of the present invention.

Referring to FIG. 4, sentence tokenizer 401 identifies the list of sentences (identified as s1, s2, s3 . . . for document "d" and s1', s2', s3' . . . for document "d'") from the received job description documents. In one embodiment, sentence tokenizer 401 uses natural language processing to identify the beginning and ending of sentences, such as identifying words separated by particular punctuation marks, such as a period or a question mark. In one embodiment, sentence tokenizer 401 utilizes sentence boundary disambiguation for identifying the beginning and ending of sentences, such as evaluating whether the preceding term to an identified period is listed in a compiled list of abbreviations (if so, then the period does not end a sentence) or whether the subsequent term to the identified period is capitalized (if so, then the period is presumed to indicate the end of the sentence).

After identifying the sentences, a word tokenizer 402 (application of job description analyzer 101, such as application 204) is used to find the list of words in strings and to tag the parts of speech (POS). In particular, word tokenizer 402 is used to identify the action-object-attribute triplet representations (actions are represented by the letter "v"; objects are represented by the letter "n" and attributes are represented by the letter "a") for each sentence as shown in FIG. 4. For example, as shown in FIG. 4, sentence s1 from document "d" includes the triplet representations of v1, n1, a1 as well as v2, n2, a1. A "NULL" indicates that there is an absence, such as absence of an object or attribute in the triplet representation. It is noted that the actions, objects and attributes associated with document d' are notated with an "'" as shown in FIG. 4.

In one embodiment, word tokenizer 402 identifies actions, objects and attributes using established dictionaries and language taxonomies. For example, words, such as "determine" and "evaluate" may be identified in established dictionaries and language taxonomies as action terms. Furthermore, in one embodiment, word tokenizer 402 utilizes natural language processing to determine the meaning of the sentence and therefore can determine the objects (refer to the thing to which the specified action is directed) and attributes (refer to the characteristic or feature of the object). For example, if the job description document used the term "draft," word tokenizer 402 may determine that the term is referring to a version of a document, plan or drawing as opposed to compulsory recruitment for military service.

An exemplary pseudo code utilized by job description analyzer 101 for representing a job description document as a collection of action, object and attribute triplets is provided below:

Algorithm:

1. S <- parse D and return a set of sentences.
2. $Rep_D$ = empty set
3. for each element $S_i$ of S
   3.1. $T_{Dep}$ <- POS tagged dependency tree by using $ST_{API}$
   3.2. parse $T_{Dep}$ and identify set of actions V
   3.3. for each element $V_i$ of V
      3.3.1. T <- empty Triplet
      3.3.2. $N_{Vi}$ <- set of corresponding objects associated with $V_i$ from $T_{dep}$
      3.3.3. for each $N_i$ in $N_{Vi}$
         3.3.3.1. $Adj_{Ni}$ <- set of corresponding attributes associated with $N_i$ from $T_{dep}$
         3.3.3.2. add $V_i$, $N_i$, $Adj_{Ni}$ to T
      3.3.4. Add T to $Rep_D$
4. Return $Rep_D$ $Rep_D$ where "D" represents a document, "S" represents a set of sentences, "T" represents an empty triplet representation, "V" represents actions, "N" represents objects, "A" represents attributes, "$Adj_{Ni}$" refers to the set of corresponding attributes associated with $N_i$, "$Rep_D$" represents an empty set, "$T_{Dep}$" represents the part-of-speech (POS) tagged dependency tree and "$N_{Vi}$" represent a set of corresponding objects associated with $V_i$ from $T_{dep}$. It is noted that the API utilized was standard core NLP API ($ST_{API}$).

In step 303, job description analyzer 101 calculates a similarity score between the first and second sets of action-object-attribute triplet representations by hierarchically matching the first and second sets of action-object-attribute triplet representations across the job description documents. In one embodiment, the similarity score between the first and second sets of action-object-attribute triplet representations is performed by solving an imbalanced assignment problem to find the best match of all triplets in the two documents. A similarity score is used to assess the degree of similarity between the sets of action-object-attribute triplet representations of the two job description documents. As shown in FIG. 4, after the semantic similarity scores are calculated 403 (discussed further below), a multilevel imbalanced classical assignment problem 404 is used to calculate an overall document score (see formula 405). A multilevel imbalanced classical assignment problem refers to an assignment problem without an equal number of rows and columns. A particular formula 405 for solving such an assignment problem to calculate the overall document score using the semantic similarity scores of the actions, objects and attributes is shown in FIG. 4.

A further discussion regarding calculating an overall similarity score for a pair of documents by solving a multilevel imbalanced classical assignment problem is discussed further below in connection with FIG. 5.

FIG. 5 is a flowchart of a method 500 for calculating an overall similarity score for a pair of documents by solving a multilevel imbalanced classical assignment problem in accordance with an embodiment of the present invention.

Referring to FIG. 5, in conjunction with FIGS. 1-4, in step 501, job description analyzer 101 calculates semantic similarity scores among actions of the action-object attribute triplet representations amongst the job description documents.

For example, if document 1 has a sentence, which states in part "determines operational feasibility by evaluating analysis, problem definition, requirements, solution development, and proposed solutions" and document 2 has a sentence, which states in part "regulates operational viability, evaluates survey, requirements and resolution development," then the following action-object-attribute triplet representations may be generated by job description analyzer 101:

Representation of Document 1:
   action: determines; object: feasibility; attributes: [operational]
   action: evaluating; object: analysis; attributes: [ ]
   action: evaluating; object: problem definition; attributes: [ ]
   action: evaluating; object: requirements; attributes: [ ]
   action: evaluating; object: solution development; attributes: [ ]
   action: evaluating; object: solutions; attributes: [proposed]

Representation of Document 2:
   action: regulates; object: viability; attributes: [operational]
   action: evaluates; object: survey; attributes: [ ]
   action: evaluates; object: requirements; attributes: [ ]
   action: evaluates; object: resolution development; attributes: [ ]

An action similarity matrix 600 may then constructed by job description analyzer 101 as shown in FIG. 6 in accordance with an embodiment of the present invention, where semantic similarity scores between the action terms of "determine" and "evaluate" as represented in the triplet representations of document 1 and the action terms "regulate" and "evaluate" as represented in the triplet representations of document 2 are shown. A "semantic similarity score," as used herein, refers to a score that indicates how similar in meaning the two terms are. The higher the score, the more similar in meaning are the two terms. In one embodiment, such scores are determined by job description analyzer 101 using natural language processing based on the similarity of meaning. As discussed above, the higher the score (up to 1.0) the greater the similarity. For example, as shown in FIG. 6, the similarity in meaning between the terms "determine" and "regulate" is assigned the score of 0.3 ($V_{A1}$); however, the similarity in meaning between the terms "evaluate" and "evaluate" is assigned the score of 1.0 ($V_{A2}$) since they have the same meaning (they are the same term).

In step 502, job description analyzer 101 identifies the assignments of actions with the highest semantic similarity scores amongst the job description documents. For example, referring to FIG. 6, the action assignment ($V_{A1}$) is regulate>determine with a value of 0.30 and the action assignment ($V_{A2}$) is evaluate>evaluate with a value of 1.0. For instance, referring to the first row of matrix 600, the value of 0.30 is greater than the value of 0.25. The value of 0.30 is the semantic similarity score assigned to the action terms of "determine" and "regulate." In the second row of matrix 600, the value of 1.0 is greater than the value of 0.31. The value of 1.0 is the semantic similarity score assigned to the action terms of "evaluate" and "evaluate."

In step 503, job description analyzer 101 calculates the semantic similarity scores among objects and attributes of the action-object-attribute triplet representations corresponding to matched actions amongst the job description documents, such as shown in FIGS. 7 and 8.

FIGS. 7 and 8 illustrate the object similarity matrices 700, 800 in accordance with an embodiment of the present invention indicating the semantic similarity scores between objects of the triplet representations of documents 1 and 2. Again, as previously discussed, the semantic similarity scores may be determined by job description analyzer 101 using natural language processing based on the similarity of meaning. The higher the score (up to 1.0) the greater the similarity. A further discussion regarding matrices 700, 800 will be proved below.

In step 504, job description analyzer 101 identifies the assignments of objects with the highest semantic similarity scores amongst job description documents corresponding to matching pairs of actions. For example, FIG. 7 shows the object similarity matrix 700 for action assignments (1) (regulate>determine) in accordance with an embodiment of the present invention. Referring to the action-object attribute triplet representations of documents 1 and 2 shown above, the object terms of "feasibility" and "viability" associated with the action terms of "determine" and "regulate," respectively, are used as object terms in the triplet representations of documents 1 and 2, respectively. Matrix 700 indicates the semantic similarity score between the terms "feasibility" and "viability."

In another example, FIG. 8 shows the object similarity matrix 800 for action assignments (2) (evaluate>evaluate) in accordance with an embodiment of the present invention. Referring to the action-object attribute triplet representations of documents 1 and 2 shown above, the object terms of "analysis," "problem definition," "requirements," "solution development" and "solutions" associated with the action term of "evaluate" are used as object terms in the triplet representation of document 1 and the object terms of "survey," "requirements" and "resolution development" associated with the action term of "evaluate" are used as object terms in the triplet representation of document 2. Matrix 800 indicates the semantic similarity scores between these terms of documents 1 and 2.

In step 505, job description analyzer 101 identifies assignments of attributes amongst the job description documents corresponding to matching pairs of objects.

For example, for action assignments (1), the semantic similarity score between the terms "feasibility" and "viability" is 0.6 (object assignment ($N_{A1}$)) as shown in matrix 700 of FIG. 7. For action assignments (2), the semantic similarity score between the terms "analysis" and "survey" is 0.36 ($N_{A2}$) (highest semantic similarity score in first row of matrix 800), the semantic similarity score between the terms "resolution development" and "problem definition" is 0.26 (highest semantic similarity score in second row of matrix 800), the semantic similarity score between the terms "requirements" and "requirements" is 1.0 ($N_{A3}$) (highest semantic similarity score in third row of matrix 800), the semantic similarity score between the terms "solution development" and "resolution development" is 0.65 ($N_{A4}$) (highest semantic similarity score in the fourth row of matrix 800) and the semantic similarity score between the terms "survey" and "solutions" is 0.34 (highest semantic similarity score in the fifth row of matrix 800) as shown in matrix 800 of FIG. 8. It is noted for clarity that only $N_{A1}$-$N_{A4}$ were identified concerning action assignments (1) and (2), since they were the top four scores across the rows of matrices 700, 800. In this exemplary embodiment of the present invention, only a total of four scores need to be identified due to the number of matching actions.

For objection assignment (1), the attribute similarity matrix 900 is shown in FIG. 9 in accordance with an embodiment of the present invention. Referring to the action-object attribute triplet representations of documents 1 and 2 shown above, the attribute terms of "operational" and "operational" are associated with the object terms of "feasibility" and "viability," respectively, of the triplet representations of documents 1 and 2. As shown in FIG. 9, matrix 900 indicates a semantic similarity score of 1.0 ($A_{A1}$) for the terms "operational" and "operational."

In step 506, job description analyzer 101 hierarchically combines the semantic similarity scores of the identified assignments of objects and attributes to generate one matching score per pair of actions in the job description documents.

In step 507, job description analyzer 101 combines the scores corresponding to all matching action pairs to create one document similarity score for the job description documents. For example, the total similarity score for the job description documents (documents 1 and 2) is as follows:

$$((V_{A1}(1+N_{A1}(1+A_{A1})/3)+(V_{A2}(1+(N_{A2}+N_{A3}+N_{A4})/3))/2)/2)$$

As discussed above, $V_{A1}$=0.3; $N_{A1}$=0.6; $A_{A1}$=1.0; $V_{A2}$=1.0; $N_{A2}$=0.36; $N_{A3}$=1.0 and $N_{A4}$=0.65. As a result, the total similarity score for job description documents 1 and 2 is 0.5275. The higher number the more similar (including similar in meaning) are the job description documents.

An exemplary pseudo code utilized by job description analyzer 101 for calculating an overall document score by solving the multilevel imbalanced classical assignment problem is provided below:

```
Algorithm:

1. V₁ <- set of actions Rep_D1 , V₂ <- set of actions from Rep_D2
2. V_mat <- semantic similarity matrix of V₁ X V₂ using W_API
3. V_map <- get the action (1 to 1) mapping from V_mat using Assign_Tech
4. Sim_score <- 0 , div <- 3 , score_V <- 0
5. for each mapping (V_1i -> V_2j) in V_map
    5.1 score_V <- score_V + semantic similarity score of V_1i and V_2j from W_API
    5.2. N₁ <- set of objects corresponding to V_1i from Rep_D1 , N₂ <- set of objects
corresponding to V_2i from Rep_D2
        5.3. N_mat <- semantic similarity matrix of N₁ X N₂ using W_API
        5.4. N_map <- get the object(1 to 1) mapping from N_mat using Assign_Tech , score_N <- 0
        5.5. for each mapping (N_1i -> N_2j) in N_map
            5.5.1. score_N <- score_N + semantic similarity score of N_1i and N_2j from W_API
            5.5.2. Adj₁ <- set of attributes corresponding to N_1i from Rep_D1 , Adj₂ <- set of
attributes corresponding to N_2i from Rep_D2
                5.5.3. Adj_mat <- semantic similarity matrix of A₁ X A₂ using W_API
                5.5.4. Adj_map <- get the attribute (1 to 1) mapping from Adj_mat using Assign_Tech
                5.5.5. score_Adj <- 0
                5.5.6. for each mapping (Adj_1i -> Adj_2j) in Adj_map
                    5.5.6.1. score_Adj = score_Adj + semantic similarity score of Adj_1i and
Adj_2j from W_API
```

-continued

Algorithm:

5.5.7. if max (| Adj$_1$|,| Adj$_2$ |)>0 , then score$_{Adj}$ = score$_{Adj}$ / max (| Adj$_1$|,| Adj$_2$ |)
    5.5.8. else div = div − 1
    5.5.10. Score$_{NADJ}$ = score$_N$ (1 + score$_{Adj}$)
  5.6. if max (| N$_1$|,| N$_2$ |)> 0 , then Score$_{NAdj}$ = Score$_{NADJ}$ / max (| N$_1$|,| N$_2$ |)
  5.7. else div = div − 1
  5.8. Score$_{VNAdj}$ = score$_V$ (1 + Score$_{NAdj}$ )/div
6. Sim$_{score}$ = Score$_{VNAdj}$ / max (| V$_1$|,| V$_2$ |)
7. Return Sim$_{score}$ Documents 1 and 2 are represented as Rep$_{D1}$ and Rep$_{D2}$. Furthermore, in one embodiment, the API used was the Wordnet dictionary API (W$_{API}$). Sim$_{score}$ represents the document similarity score for the job description documents.

In this manner, the present invention addresses the technical problem of not effectively and accurately identifying similar job positions/job descriptions. The present invention provides a technological solution to the technical problem by representing sentences in the job description documents as action-object-attribute triplet representations and then calculating a similarity score between the action-object-attribute triplet representations of the job description documents by hierarchically matching the action-object-attribute triplet representations across the job description documents.

The technological solution implemented by the present invention cannot be performed in the human mind or by a human using a pen and paper. A human cannot appropriately calculate a similarity score between the sets of action-object-attribute triplet representations from the two job description documents in any reasonable amount of time and with any reasonable expectation of accuracy without the use of a computer. As discussed herein, the present invention calculates the similarity score between such triplet representations by hierarchically matching triplets across the documents. This is performed as an imbalanced assignment problem to identify the best match of all triplets in the two documents. An imbalanced assignment problem is an assignment problem without an equal number of rows and columns. Solving such an imbalanced assignment problem cannot be performed by a human in any reasonable amount of time and with any reasonable expectation of accuracy without the use of a computer. Furthermore, parsing the job description documents and generating such action-object-attribute triplet representations cannot be performed by a human in any reasonable amount of time and with any reasonable expectation of accuracy without the use of a computer.

Furthermore, the present invention reduces the utilization of computing resources (e.g., processor utilization, memory utilization) by more effectively and accurately identifying similar job positions/job descriptions. Without the present invention, a user would spend more time in determining the similarity between job positions/job descriptions thereby inefficiently utilizing computing resources. That is, without the present invention, more computing resources (e.g., processor utilization, memory utilization) would be utilized without accurately identifying similar job positions/job descriptions.

The present invention may be utilized to map any jobs to a standard job taxonomy thereby enabling a plethora of workforce analytics, such as hiring analytics, career advising analytics as well as suggesting employee assignments to projects.

In one embodiment, additional content may be received to be added to one or both of the job description documents. When such a situation occurs, the process discussed above may be reiterated to calculate a new similarity score for the job description documents. For example, suppose that content is added to both job description documents, then the added content is parsed to generate further action-object-attribute triplet representations for the job description documents. The sets of action-object-attribute triplet representations previously generated for the job description documents will then be updated with the newly generated action-object-attribute triplet representations. A new similarity score between the updated sets of action-object-attribute triplet representations for the two job description documents is calculated by hierarchically matching the updated sets of action-object-attribute triplet representations across the job description documents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for assessing similarity between two job description documents, the method comprising:
receiving, by a job description analyzer, a first and a second job description document, wherein each of said first and second job description documents comprises sentences represented as a set of actions, an object corresponding to each action and a set of attributes corresponding to said object;
parsing, by said job description analyzer, said first and second job description documents to generate a first and a second set of an action-object-attribute triplet representation, wherein a sentence tokenizer of said job description analyzer identifies a list of sentences in each of said first and second job description documents using natural language processing, wherein a word tokenizer of said job description analyzer identifies an action-object-attribute triplet representation for each sentence using dictionaries, language taxonomies and natural language processing, wherein said first set of action-object-attribute triplet representation is associated with said first job description document and said second set of action-object-attribute triplet representation is associated with said second job description document;

constructing, by said job description analyzer, an action similarity matrix containing semantic similarity scores between action terms represented in a triplet representation of a first document and action terms represented in a triplet representation of a second document, wherein said semantic similarity scores indicate how similar in meaning two terms are;

identifying, by said job description analyzer, assignments of actions with a highest semantic similarity score among job description documents based on said action similarity matrix;

calculating, by said job description analyzer, semantic similarity scores among objects and attributes of said action-object-attribute triplet representations corresponding to matched actions amongst said job description documents;

identifying, by said job description analyzer, assignments of objects with highest semantic similarity scores amongst said job description documents corresponding to matching pairs of actions using an object similarity matrix for action assignments which identifies a semantic similarity between object terms;

identifying, by said job description analyzer, assignments of attributes amongst said job description documents corresponding to matching pairs of objects using an attribute similarity matrix containing semantic similarity scores between attribute terms associated with object terms of said triplet representations of said job description documents;

hierarchically combining, by said job description analyzer, semantic similarity scores of said identified assignments of objects and said identified assignments of attributes to generate one matching score per pair of actions in said job description documents;

combining, by said job description analyzer, scores corresponding to all matching action pairs to create one document similarity score for said job description documents, wherein said document similarity score for said first and second job description documents is $((V_{A1} (1+N_{A1} (1+A_{A1})/3)+(V_{A2}(1+(N_{A2}+N_{A3}+N_{A4})/3))/2)/2)$, where $V_{A1}$ is a semantic similarity score between action terms represented in triplet representations of said first document, where $V_{A2}$ is a semantic similarity score between action terms represented in triplet representations of said second document, where $N_{A1}$ is a highest similarity score in a first row of said object similarity matrix, where $N_{A2}$ is a highest similarity score in a second row of said object similarity matrix, where $N_{A3}$ is a highest similarity score in a third row of said object similarity matrix, where $N_{A4}$ is a highest similarity score in a fourth row of said object similarity matrix, where $A_{A1}$ is a semantic similarity score for said attribute terms associated with said object terms of said triplet representations of said first and second job description documents; and determining, by said job description analyzer, a degree of similarity between said first and said second job description documents based on said document similarity score for said first and second description documents, wherein the higher a value of said document similarity score, the greater the degree of similarity between said first and second job description documents.

2. The method as recited in claim 1 further comprising:
calculating semantic similarity scores among actions of said first and second sets of action-object-attribute triplet representations amongst said first and second job description documents.

3. The method as recited in claim 1 further comprising:
identifying assignments of actions with highest semantic similarity scores amongst said first and second job description documents.

4. The method as recited in claim 1, wherein said sentence tokenizer identifies a beginning and an ending of sentences from said received first and second job descriptions using natural language processing or sentence boundary disambiguation, wherein after identifying said sentences from said received first and second job descriptions, said word tokenizer is used to identify a list of words in strings and to tag parts of speech, wherein said word tokenizer identifies actions, objects and attributes using said dictionaries and said language taxonomies.

5. A computer program product for assessing similarity between two job description documents, the computer program product comprising one or more computer readable storage mediums having program code embodied therewith, the program code comprising programming instructions for:

receiving, by a job description analyzer, a first and a second job description document, wherein each of said first and second job description documents comprises sentences represented as a set of actions, an object corresponding to each action and a set of attributes corresponding to said object;

parsing, by said job description analyzer, said first and second job description documents to generate a first and a second set of an action-object-attribute triplet representation, wherein a sentence tokenizer of said job description analyzer identifies a list of sentences in each of said first and second job description documents using natural language processing, wherein a word tokenizer of said job description analyzer identifies an action-object-attribute triplet representation for each sentence using dictionaries, language taxonomies and natural language processing, wherein said first set of action-object-attribute triplet representation is associated with said first job description document and said second set of action-object-attribute triplet representation is associated with said second job description document;

constructing, by said job description analyzer, an action similarity matrix containing semantic similarity scores between action terms represented in a triplet representation of a first document and action terms represented in a triplet representation of a second document, wherein said semantic similarity scores indicate how similar in meaning two terms are;

identifying, by said job description analyzer, assignments of actions with a highest semantic similarity score among job description documents based on said action similarity matrix;

calculating, by said job description analyzer, semantic similarity scores among objects and attributes of said action-object-attribute triplet representations corresponding to matched actions amongst said job description documents;

identifying, by said job description analyzer, assignments of objects with highest semantic similarity scores amongst said job description documents corresponding to matching pairs of actions using an object similarity matrix for action assignments which identifies a semantic similarity between object terms;

identifying, by said job description analyzer, assignments of attributes amongst said job description documents corresponding to matching pairs of objects using an attribute similarity matrix containing semantic similarity scores between attribute terms associated with object terms of said triplet representations of said job description documents;

hierarchically combining, by said job description analyzer, semantic similarity scores of said identified assignments of objects and said identified assignments of attributes to generate one matching score per pair of actions in said job description documents;

combining, by said job description analyzer, scores corresponding to all matching action pairs to create one document similarity score for said job description documents, wherein said document similarity score for said first and second job description documents is $((V_{A1} (1+N_{A1} (1+A_{A1})/3)+ (V_{A2} (1+ (N_{A2}+N_{A3}+N_{A4})/3))/2)/2)$, where $V_{A1}$ is a semantic similarity score between action terms represented in triplet representations of said first document, where $V_{A2}$ is a semantic similarity score between action terms represented in triplet representations of said second document, where $N_{A1}$ is a highest similarity score in a first row of said object similarity matrix, where $N_{A2}$ is a highest similarity score in a second row of said object similarity matrix, where $N_{A3}$ is a highest similarity score in a third row of said object similarity matrix, where $N_{A4}$ is a highest similarity score in a fourth row of said object similarity matrix, where $A_{A1}$ is a semantic similarity score for said attribute terms associated with said object terms of said triplet representations of said first and second job description documents; and determining, by said job description analyzer, a degree of similarity between said first and said second job description documents based on said document similarity score for said first and second description documents, wherein the higher a value of said document similarity score, the greater the degree of similarity between said first and second job description documents.

6. The computer program product as recited in claim 5, wherein the program code further comprises the programming instructions for:

calculating semantic similarity scores among actions of said first and second sets of action-object-attribute triplet representations amongst said first and second job description documents.

7. The computer program product as recited in claim 5, wherein the program code further comprises the programming instructions for:

identifying assignments of actions with highest semantic similarity scores amongst said first and second job description documents.

8. The computer program product as recited in claim 5, wherein said sentence tokenizer identifies a beginning and an ending of sentences from said received first and second job descriptions using natural language processing or sentence boundary disambiguation, wherein after identifying said sentences from said received first and second job descriptions, said word tokenizer is used to identify a list of words in strings and to tag parts of speech, wherein said word tokenizer identifies actions, objects and attributes using said dictionaries and said language taxonomies.

9. A job description analyzer, comprising:
a memory for storing a computer program for assessing similarity between two job description documents; and
a processor connected to said memory, wherein said processor is configured to execute program instructions of the computer program comprising:

receiving a first and a second job description document, wherein each of said first and second job description documents comprises sentences represented as a set of actions, an object corresponding to each action and a set of attributes corresponding to said object;

parsing said first and second job description documents to generate a first and a second set of an action-object-attribute triplet representation, wherein a sentence tokenizer of said job description analyzer identifies a list of sentences in each of said first and second job description documents using natural language processing, wherein a word tokenizer of said job description analyzer identifies an action-object-attribute triplet representation for each sentence using dictionaries, language taxonomies and natural language processing, wherein said first set of action-object-attribute triplet representation is associated with said first job description document and said second set of action-object-attribute triplet representation is associated with said second job description document;

constructing an action similarity matrix containing semantic similarity scores between action terms represented in a triplet representation of a first document and action terms represented in a triplet representation of a second document, wherein said semantic similarity scores indicate how similar in meaning two terms are;

identifying assignments of actions with a highest semantic similarity score among job description documents based on said action similarity matrix;

calculating semantic similarity scores among objects and attributes of said action-object-attribute triplet representations corresponding to matched actions amongst said job description documents;

identifying assignments of objects with highest semantic similarity scores amongst said job description documents corresponding to matching pairs of actions using an object similarity matrix for action assignments which identifies a semantic similarity between object terms;

identifying assignments of attributes amongst said job description documents corresponding to matching pairs of objects using an attribute similarity matrix containing semantic similarity scores between attribute terms associated with object terms of said triplet representations of said job description documents;

hierarchically combining semantic similarity scores of said identified assignments of objects and said identified assignments of attributes to generate one matching score per pair of actions in said job description documents;

combining scores corresponding to all matching action pairs to create one document similarity score for said job description documents, wherein said document similarity score for said first and second job description documents is $((V_{A1} (1+N_{A1} (1+A_{A1})/3)+ (V_{A2} (1+ (N_{A2}+N_{A3}+N_{A4})/3))/2)/2)$, where $V_{A1}$ is a semantic similarity score between action terms represented in triplet representations of said first document, where $V_{A2}$ is a semantic similarity score between action terms represented in triplet representations of said second document, where $N_{A1}$ is a highest similarity score in a first row of said object similarity matrix, where $N_{A2}$ is a highest similarity score in a second row of said object similarity matrix, where $N_{A3}$ is a highest similarity score in a third row of said object similarity matrix, where $N_{A4}$ is a highest similarity score in a fourth row of said object similarity matrix, where $A_{A1}$ is a semantic similarity score for said attribute terms associated with said object terms of said triplet representations of said first and second job description documents; and determining a degree of similarity between said first and said second job description documents based on said document similarity score for said first and second description documents, wherein the higher a value of said document similarity score, the greater the degree of similarity between said first and second job description documents.

10. The job description analyzer as recited in claim 9, wherein the program instructions of the computer program further comprise:

calculating semantic similarity scores among actions of said first and second sets of action-object-attribute triplet representations amongst said first and second job description documents.

11. The job description analyzer as recited in claim 9, wherein the program instructions of the computer program further comprise: identifying assignments of actions with highest semantic similarity scores amongst said first and second job description documents.

12. The job description analyzer as recited in claim 9, wherein said sentence tokenizer identifies a beginning and an ending of sentences from said received first and second job descriptions using natural language processing or sentence boundary disambiguation, wherein after identifying said sentences from said received first and second job descriptions, said word tokenizer is used to identify a list of words in strings and to tag parts of speech, wherein said word tokenizer identifies actions, objects and attributes using said dictionaries and said language taxonomies.

* * * * *